United States Patent
Sarma et al.

(10) Patent No.: US 11,573,420 B2
(45) Date of Patent: Feb. 7, 2023

(54) AUGMENTED REALITY SYSTEMS WITH DYNAMIC SEE-THROUGH TRANSMITTANCE CONTROL

(71) Applicant: HONEYWELL INTERNATIONAL INC., Morris Plains, NJ (US)

(72) Inventors: Kalluri R. Sarma, Phoenix, AZ (US); Brent D. Larson, Phoenix, AZ (US); Kenneth Leiphon, Phoenix, AZ (US)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 316 days.

(21) Appl. No.: 16/884,484

(22) Filed: May 27, 2020

(65) Prior Publication Data
US 2021/0373334 A1 Dec. 2, 2021

(51) Int. Cl.
G02B 27/01 (2006.01)
G02F 1/1514 (2019.01)
G02F 1/133 (2006.01)
G02F 1/163 (2006.01)

(52) U.S. Cl.
CPC ..... *G02B 27/0172* (2013.01); *G02F 1/13306* (2013.01); *G02F 1/1514* (2019.01); *G02F 1/163* (2013.01); *G02B 2027/0118* (2013.01); *G02F 2201/44* (2013.01)

(58) Field of Classification Search
CPC ........ G02B 27/0172; G02B 2027/0118; G02B 27/0101; G02F 1/13306; G02F 1/1514; G02F 1/163; G02F 2201/44; G02F 1/15165; G02F 1/133502
See application file for complete search history.

(56) References Cited

U.S. PATENT DOCUMENTS

| | | | |
|---|---|---|---|
| 9,129,295 B2 | 9/2015 | Border et al. | |
| 9,746,739 B2 | 8/2017 | Alton et al. | |
| 9,995,933 B2 | 6/2018 | Alton et al. | |
| 10,078,236 B2 | 9/2018 | Hayashi et al. | |
| 10,319,312 B2 | 6/2019 | Lu et al. | |

(Continued)

FOREIGN PATENT DOCUMENTS

| | | |
|---|---|---|
| DE | 202010013016 U1 | 2/2011 |
| GB | 2120397 A | 11/1983 |
| WO | 2020076741 A1 | 4/2020 |

*Primary Examiner* — Amit Chatly
(74) *Attorney, Agent, or Firm* — Lorenz & Kopf, LLP

(57) ABSTRACT

An augmented display system with dynamic see-through transmittance control is disclosed. The augmented display system includes: an augmented display screen; a tandem electrochromic (EC) filter disposed over the augmented display screen. The tandem EC filter includes a first window having a dominant first transmittance characteristic and a second window having a dominant second transmittance characteristic; and an augmented display transmittance controller configured to individually control the activation of the first window and the second window of the tandem EC filter, wherein the augmented display transmittance controller is configured to: determine from an ambient light sensor output the transmittance required from the first window and the second window for a selected augmented display luminance; and apply appropriate drive voltage waveforms to the first window and the second window to achieve the determined transmittance.

20 Claims, 5 Drawing Sheets

(56) References Cited

U.S. PATENT DOCUMENTS

| | | | |
|---|---|---|---|
| 2010/0277786 A1* | 11/2010 | Anderson | G02F 1/1313 359/485.05 |
| 2017/0184894 A1* | 6/2017 | Hayashi | G02F 1/13318 |
| 2017/0272737 A1* | 9/2017 | Jacobs | G02B 30/23 |
| 2019/0353908 A1 | 11/2019 | Igarashi et al. | |
| 2019/0384062 A1 | 12/2019 | Wilson et al. | |

* cited by examiner

AUGMENTED REALITY SYSTEMS WITH DYNAMIC SEE-THROUGH TRANSMITTANCE CONTROL

TECHNICAL FIELD

Embodiments of the subject matter described herein relate generally to augmented display systems such as augmented reality systems. More particularly, embodiments of the subject matter relate to electronically adjustable filters for use with augmented display systems.

BACKGROUND

A current approach to achieving sunlight readability for augmented reality (AR) display systems is to increase the display brightness to very high levels (e.g., 1000 s of fL (foot-lambert)) to overpower the outside scene brightness to maintain adequate image contrast and readability. This brute force approach may lead to undesirably high power consumption and associated display heat dissipation issues, and display lifetime degradation issues. Use of visible spectrum, switchable optical windows to control the transmission of ambient light can obviate the need for increasing the AR display luminance to undesirably high levels. The desired characteristics of these switchable visible spectrum optical windows for sunlight readable AR display systems include high transmission (>60%), color neutrality in the visible wavelength band, long device lifetime, low power consumption and fast switching speed (~1 second or less). The current electronic windows have either fast switching speed (e.g., GH-LC, guest-host liquid crystal-based windows with tens of millisecond switching speed) with limited dynamic transmittance range (e.g., <10:1), or high dynamic transmittance range (e.g., gel based electrochromic windows with >100:1 transmittance range) but very slow switching speed (e.g., 10 s of seconds). These limitations make them unsuitable for use in the AR display systems in high ambient lighting conditions such as direct sunlight without significant penalties related to power consumption, heat dissipation, and display lifetime degradation.

Hence, it is desirable to provide electronically switchable visible-spectrum optical windows with high dynamic transmittance range as well as fast switching speed. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an augmented display system with dynamic see-through transmittance control is disclosed. The augmented display system includes: an augmented display screen; a tandem electrochromic (EC) filter disposed over the augmented display screen. The tandem EC filter includes a first window having a dominant first transmittance characteristic and a second window having a dominant second transmittance characteristic; and an augmented display transmittance controller configured to individually control the activation of the first window and the second window of the tandem EC filter, wherein the augmented display transmittance controller is configured to: determine from an ambient light sensor output the transmittance required from the first window and the second window for a selected augmented display luminance; and apply appropriate drive voltage waveforms to the first window and the second window to achieve the determined transmittance.

In another embodiment, an augmented display system with dynamic see-through transmittance control is disclosed. The augmented display system includes: an augmented display screen; a tandem electrochromic (EC) filter disposed over the augmented display screen, wherein the tandem EC filter includes a first window that provides a dynamic range of greater than 100:1 with a switching speed of around several seconds or more disposed over a second window with a switching speed of around several milliseconds or less and a dynamic transmittance range of around 10:1; and an augmented display transmittance system controller for individually controlling the activation of the first window and the second window of the EC tandem filter. The augmented display transmittance system controller is configured to: determine from an ambient light sensor output the transmittance required from the first window and the second window for a selected augmented display luminance, activate only the second window to achieve the determined transmittance, for example through the application of an appropriate drive voltage waveform, when the determined transmittance can be achieved using only the second window, and activate both the first window and the second window, for example through the application of appropriate drive voltage waveforms, when the determined transmittance cannot be achieved using only the second window.

In another embodiment, an augmented display system with dynamic see-through transmittance control is disclosed. The augmented display system includes: an augmented display screen; a tandem electrochromic (EC) filter disposed over the augmented display screen, wherein the tandem EC filter includes a first window optimized for faster clearing (EC-C) and a second window optimized for faster darkening (EC-D); and an augmented display transmittance controller configured to individually control the activation of the first window and the second window of the tandem EC filter. The augmented display transmittance controller is configured to: determine from an ambient light sensor output the transmittance required from the first window and the second window for a selected augmented display luminance and the direction of transition (e.g., darkening or clearing) for the selected augmented display luminance; and activate both the first window and the second window, for example through the application of appropriate drive voltage waveforms, to achieve the determined transmittance.

In another embodiment, an augmented display system with dynamic see-through transmittance control is disclosed. The augmented display system includes: an augmented display screen; a tandem electrochromic (EC) filter disposed over the augmented display screen wherein the tandem EC filter includes a gel-based EC window that provides a higher dynamic range (>100:1) but a slower switching speed (~several seconds) laminated to a LC (Liquid Crystal) based electronic window with a faster switching speed (~several milli-seconds) and a lower dynamic transmittance range (~10:1); and an augmented display transmittance controller configured to individually control the activation of the EC window and the LC-based window of the EC tandem filter, wherein the augmented display transmittance controller is configured to: determine from an ambient light sensor output the transmittance required from the EC window and the LC-based window for a selected augmented display luminance, activate only the LC-based window to achieve the determined transmittance when the determined transmittance can be achieved using only the LC-based window, activate both the LC-based window and the EC window when the determined transmittance cannot be achieved using only the LC-based window, and activate both the LC-based window and the EC window, for example through the application of appropriate drive voltage waveforms.

In another embodiment, an augmented display system with dynamic see-through transmittance control is disclosed. The augmented display system includes: an augmented display screen; a tandem electrochromic (EC) filter disposed over the augmented display screen, wherein the tandem EC filter includes a first gel-based EC window optimized for faster clearing (EC-C) and a second gel-based EC window optimized for faster darkening (EC-D), wherein the composition of the EC gel and the EC cell design parameters in the EC-C window are optimized to achieve faster clearing and the EC gel and the EC cell design parameters in the EC-D window are optimized to achieve faster darkening times; and an augmented display transmittance controller configured to individually control the activation of the EC-C window and the EC-D window of the tandem EC filter, wherein the augmented display transmittance controller is configured to: determine from an ambient light sensor output the transmittance required from the EC-C window and the EC-D window for a selected augmented display luminance and the direction of transition (e.g., darkening or clearing) for the selected augmented display luminance, perform a darkening transition by: applying darkening drive voltage algorithms to the EC-D window and the EC-C window simultaneously, when the transmittance value of the tandem EC filter approaches close to the determined transmittance, continue applying a darkening voltage drive algorithm to the EC-C window while applying a clearing drive voltage algorithm to the EC-D window until the EC-C window and the tandem EC filter reach the determined transmittance with the EC-D window at maximum transmittance wherein the EC-D window is clear and the EC-C window is controlling the transmittance; and perform a clearing transition by: applying clearing drive voltage algorithms to the EC-D window and the EC-C window simultaneously, and when the transmittance value of the tandem EC filter approaches close to the determined transmittance, continue applying a clearing voltage drive algorithm to the EC-D window while applying a darkening drive voltage algorithm to the EC-C window until the tandem EC filter reaches the determined transmittance.

In another embodiment, a tandem electrochromic (EC) filter for use in an augmented display system with dynamic see-through transmittance control is disclosed. The tandem EC filter includes a first window that provides a dynamic range of greater than 100:1 with a switching speed of around several seconds or more disposed over a second window with a switching speed of around several milli-seconds or less and a dynamic transmittance range of around 10:1. The augmented display system includes an augmented display screen; the tandem EC filter disposed over the augmented display screen; and an augmented display transmittance system controller for individually controlling the activation of the first window and the second window of the EC tandem filter. The augmented display transmittance system controller is configured to: determine from an ambient light sensor output the transmittance required from the first window and the second window for a selected augmented display luminance, activate only the second window to achieve the determined transmittance, for example through the application of an appropriate drive voltage waveform, when the determined transmittance can be achieved using only the second window, and activate both the first window and the second window, for example through the application of appropriate drive voltage waveforms, when the determined transmittance cannot be achieved using only the second window.

In another embodiment, a tandem electrochromic (EC) filter for use in an augmented display system with dynamic see-through transmittance control is disclosed. The tandem EC filter includes a first window optimized for faster clearing (EC-C) and a second window optimized for faster darkening (EC-D). The augmented display system includes: an augmented display screen; the tandem electrochromic EC filter disposed over the augmented display screen; and an augmented display transmittance controller configured to individually control the activation of the first window and the second window of the tandem EC filter. The augmented display transmittance controller is configured to: determine from an ambient light sensor output the transmittance required from the first window and the second window for a selected augmented display luminance and the direction of transition (e.g., darkening or clearing) for the selected augmented display luminance; and activate both the first window and the second window, for example through the application of appropriate drive voltage waveforms, to achieve the determined transmittance.

Furthermore, other desirable features and characteristics will become apparent from the subsequent detailed description and the appended claims, taken in conjunction with the accompanying drawings and the preceding background.

BRIEF DESCRIPTION OF THE DRAWINGS

Embodiments of the subject matter will hereinafter be described in conjunction with the following drawing figures, wherein like numerals denote like elements, and wherein.

DETAILED DESCRIPTION

Figure 1A:
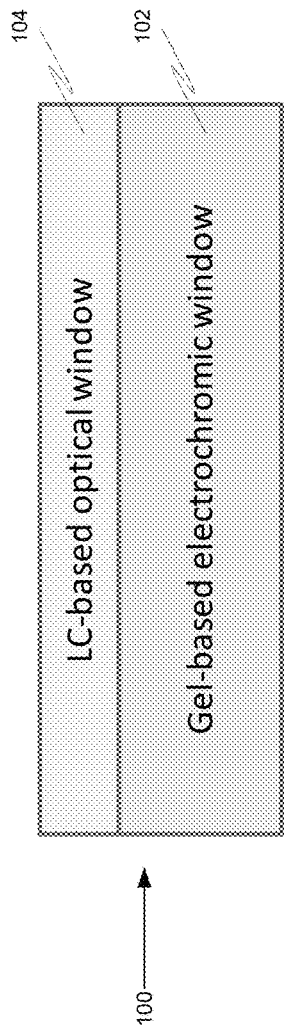
FIG. 1A is a block diagram depicting an example tandem EC filter architecture 100 for an augmented display system, in accordance with some embodiments.

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The subject matter described herein discloses apparatus, systems, techniques and articles for providing electronically switchable visible spectrum optical windows that are capable of wide dynamic range control of the see-through (ambient) scene luminance and can enable sunlight readable augmented display systems (e.g., augmented reality (AR) display systems) with optimum image contrast of the augmented display against the scene luminance. The apparatus, systems, techniques and articles provided herein provide electronically switchable visible-spectrum optical windows with a high dynamic transmittance range as well as fast switching speed that can be used to render augmented display systems, such as AR display systems, useable in a broad range of external/ambient lighting conditions including direct sunlight. These electronically switchable visible-spectrum optical windows may also be used for a variety of other applications including military ground vehicles, and automotive and avionic HUDs. The apparatus, systems, techniques and articles provided herein can enable the use of see-through (e.g., wearable/head mounted) augmented display systems under a wide range of external ambient lighting conditions including direct sunlight. The apparatus, systems, techniques and articles provided herein can provide performance improvements for see-through augmented display systems with high power efficiency, without heat dissipation issues and device lifetime degradation issues. The apparatus, systems, techniques and articles provided herein are applicable to a broad set of augmented display applications including see-through augmented reality (AR) display systems, automotive and avionic heads up displays (HUDs), and military vehicle windows. The apparatus, systems, techniques and articles provided herein can achieve the objective of realizing a high dynamic range transmittance control and fast switching speed using a unique electrochromic (EC) optical filter structure and transmittance control algorithms.

FIG. 1A is a block diagram depicting an example tandem EC filter architecture 100 for an augmented display system. The example tandem EC filter architecture 100 comprises a gel-based electrochromic (EC) window 102 that provides a high dynamic range (>100:1) but slower switching speed (~several seconds), laminated to a second electronic window 104 with a faster switching speed (~several milli-seconds) and lower dynamic transmittance range (~10:1) such as a Guest-Host LC (Liquid Crystal) device. The example tandem EC filter architecture 100 provides electronically switchable visible spectrum optical windows capable of wide dynamic range control of the see-through (ambient) scene luminance that can enable sunlight readable augmented display systems with optimum image contrast of the augmented display against the scene luminance.

Figure 1B:
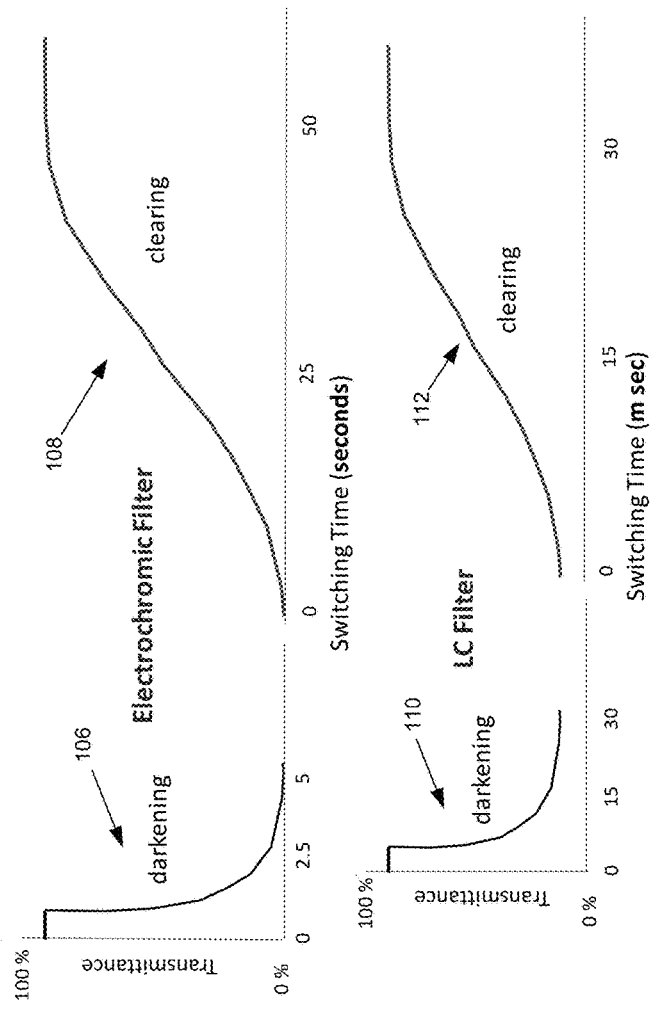
FIG. 1B is a diagram containing graphs that schematically illustrate example differences in dynamic transmittance ranges and switching speeds between an example EC filter and an example LC filter in the tandem EC filter architecture, in accordance with some embodiments.

FIG. 1B is a diagram containing graphs 106, 108, 110 and 112 that schematically illustrates example differences in dynamic transmittance ranges and switching speeds between an example EC filter 102 and an example LC filter 104 in the tandem EC filter architecture 100. Graph 106 illustrates that an example gel-based EC window 102 may take several seconds to darken a scene viewed through the tandem EC filter architecture 100 through reducing the transmission of external light. Graph 108 illustrates that the example gel-based EC window 102 may take tens of seconds to lighten a scene viewed through the tandem EC filter architecture 100 through increasing the transmission of external light. Graph 110 illustrates that an example LC electronic window 104 may take tens of milliseconds to darken a scene viewed through the tandem EC filter architecture 100 through reducing the transmission of external light. Graph 112 illustrates that the example LC electronic window 104 may take tens of milliseconds to lighten a scene viewed through the tandem EC filter architecture 100 through increasing the transmission of external light. These graphs illustrate that the example LC electronic window 104 can begin the process of lightening or darkening a scene much quicker (milliseconds) than the example gel-based electrochromic window 102 (seconds).

The example tandem EC filter architecture 100 provides an electronically switchable visible-spectrum optical window with high dynamic transmittance range as well as fast switching speed, to enable augmented display systems, such as augmented reality (AR) systems, useable in the broad range of external lighting conditions including direct sunlight. These windows may also be used for a variety of other applications including military ground vehicles, and automotive and avionic HUDs.

Figure 2:
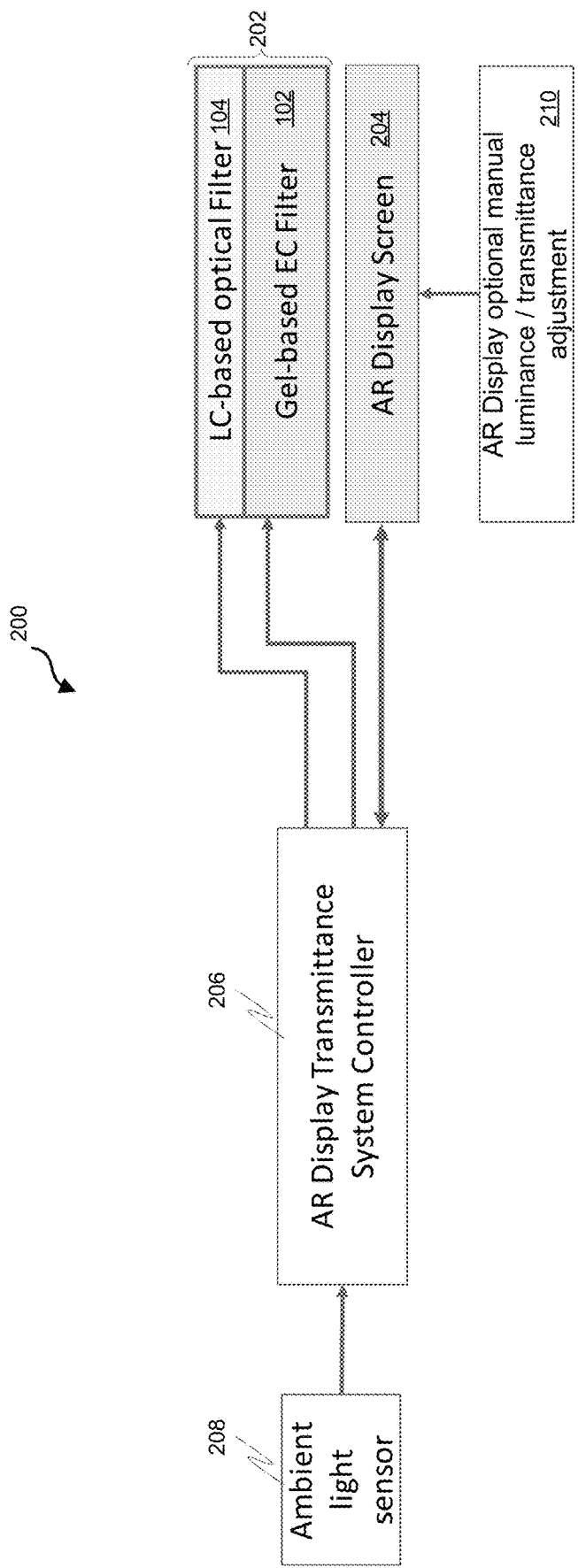
FIG. 2 is a block diagram depicting an example augmented display system that utilizes a tandem EC filter disposed over an augmented display screen, in accordance with some embodiments.

FIG. 2 is a block diagram depicting an example augmented display system 200 that utilizes a tandem EC filter 202 disposed over an augmented display screen 204 (e.g., an augmented reality display screen, an aircraft or land vehicle HUD, and others). The example augmented display system 200 includes the tandem EC filter 202 disposed over an augmented display screen 204 and an augmented display transmittance system controller 206 coupled to an ambient light sensor 208. The tandem EC filter 202 comprises a gel-based EC window 102 that provides a high dynamic range (>100:1) but slower switching speed (~several seconds) laminated to a LC (Liquid Crystal) based electronic window 104 with a faster switching speed (~several milliseconds) and lower dynamic transmittance range (~10:1). The example augmented display system 200 may also include an optional manual luminance and/or transmittance adjustment 210 for manually adjusting the brightness level applied to the augmented display screen 204, and/or transmittance level applied to the EC filter 202.

Output from the ambient light sensor 208 is used by the augmented display transmittance system controller 206 to determine the transmittance required from the switchable tandem EC filter 202 for a selected display luminance for the augmented display screen 204 for achieving a desired image contrast. If the commanded transmittance change can be accommodated by the LC filter 104 alone, then the augmented display transmittance system controller 206 can control the LC filter 104 alone to affect the required transmittance control very quickly (in a few 10 s of milli-sec). If the transmittance change required is larger than that which the LC filter 104 alone can achieve, both the by LC filter 104 and EC filter 102 are activated by the augmented display transmittance system controller 206 (e.g., by applying the appropriate/corresponding drive voltage waveforms). The augmented display transmittance system controller 206 can use this same transmittance control procedure both for window darkening as well as for window clearing transitions, because the LC filter 104 can switch an order of magnitude faster than the EC filter 102 can switch for both the darkening and clearing transitions.

The augmented display transmittance system controller 206 includes at least one processor and a computer-readable storage device or media encoded with programming instructions for configuring the controller 206. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller 206.

The augmented display transmittance system controller 206 is configured to individually control the of the EC window and the LC-based window of the EC tandem filter. In particular, the augmented display transmittance system controller 206 is configured to: determine from an ambient light sensor output the transmittance required from the EC window 102 and the LC-based window 104 for a selected augmented display luminance, activate the LC-based window 104 to achieve the determined transmittance when the determined transmittance can be achieved using only the LC-based window 104, activate both the LC-based window 104 and the EC window 102 when the determined transmittance cannot be achieved using only the LC-based window 104, and activate both the LC-based window 104 and the EC window 102, for example, by applying appropriate drive voltage waveforms.

Thus, the example augmented display system 200 provides a tandem EC filter 202 that provides wide dynamic transmittance range using the EC filter 102, and a fast response (e.g., ~30 milli-sec) using the LC filter 104. While the maximum transmittance of the tandem EC filter 202 is expected to be somewhat lower than that available from the single EC filter 102 alone, the tandem EC filter 202 nonetheless would provide a transmittance that is higher than a general transmittance requirement of >70%, as both the LC filter 104 and the EC filter 102 in the tandem EC filter 202 can achieve a transmittance of >85% with appropriate antireflection coatings applied.

Figure 3A:
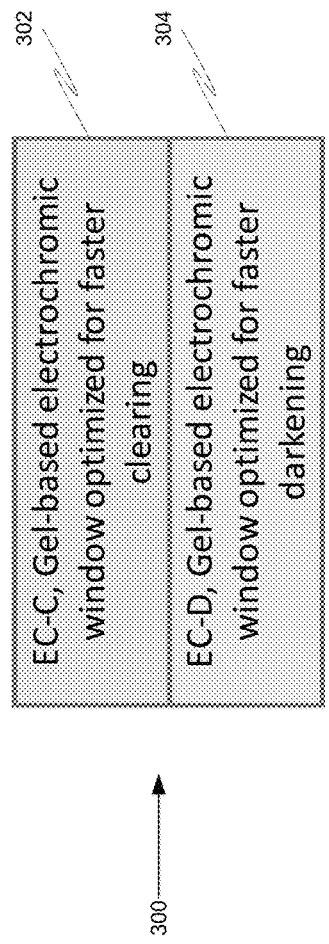
FIG. 3A is a block diagram depicting an example tandem EC filter for an augmented display system, in accordance with some embodiments.

FIG. 3A is a block diagram depicting an example tandem EC filter 300 for an augmented display system. The example tandem EC filter 300 comprises a stack of 2 electrochromic (EC) filters, a first filter (EC-C) 302 that is optimized for faster clearing and a second filter (EC-D) 304 that is optimized for faster darkening. By optimizing the composition of the EC gel and the EC cell design parameters, the design can be optimized to achieve either faster clearing or faster darkening times. The example tandem EC filter architecture 300 provides electronically switchable visible spectrum optical windows capable of wide dynamic range control of the see-through (ambient) scene luminance that can enable sunlight readable augmented display systems with optimum image contrast of the augmented display against the scene luminance.

Figure 3B:
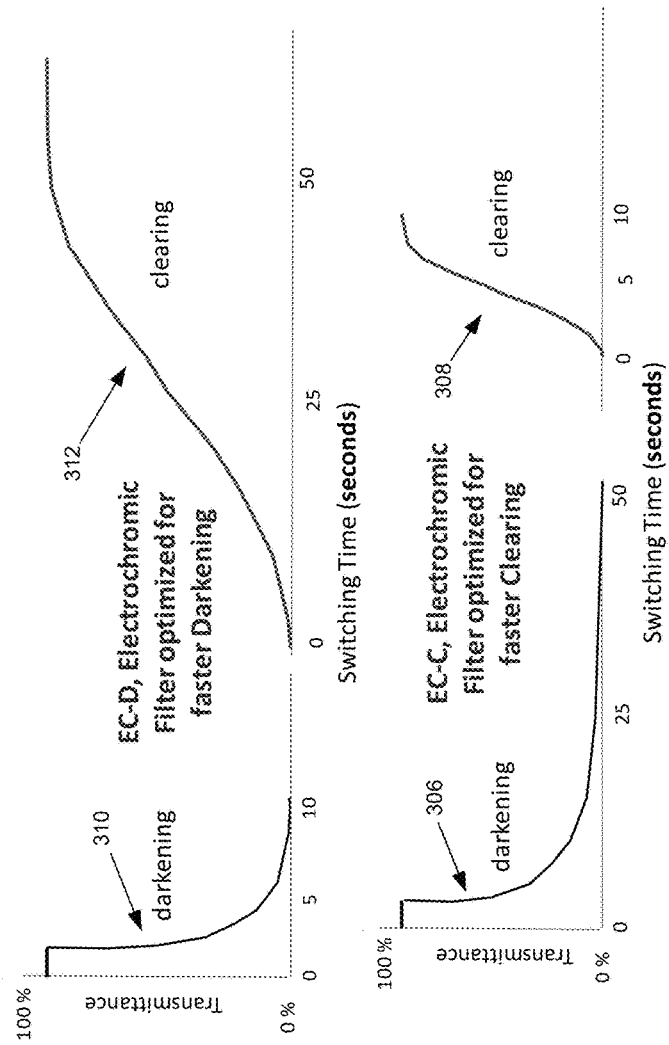
FIG. 3B is a diagram containing graphs that schematically illustrates example differences in dynamic transmittance ranges and switching speeds between the example first filter (EC-C) and the example second filter (EC-D) in the tandem EC filter architecture, in accordance with some embodiments.

FIG. 3B is a diagram containing graphs 306, 308, 310 and 312 that schematically illustrates example differences in dynamic transmittance ranges and switching speeds between the example first filter (EC-C) 302 and the example second filter (EC-D) 304 in the tandem EC filter architecture 300. Graph 306 illustrates that an example first filter (EC-C) 302 may take tens of seconds to darken a scene viewed through the tandem EC filter architecture 100 through reducing the transmission of external light. Graph 308 illustrates that the example first filter (EC-C) 302 may take several seconds to lighten a scene viewed through the tandem EC filter architecture 300 through increasing the transmission of external light. Graph 310 illustrates that an example second filter (EC-D) 304 may take several seconds to darken a scene viewed through the tandem EC filter architecture 300 through reducing the transmission of external light. Graph 312 illustrates that the example second filter (EC-D) 304 may take several tens of seconds to lighten a scene viewed through the tandem EC filter architecture 300 through increasing the transmission of external light.

Figure 4:
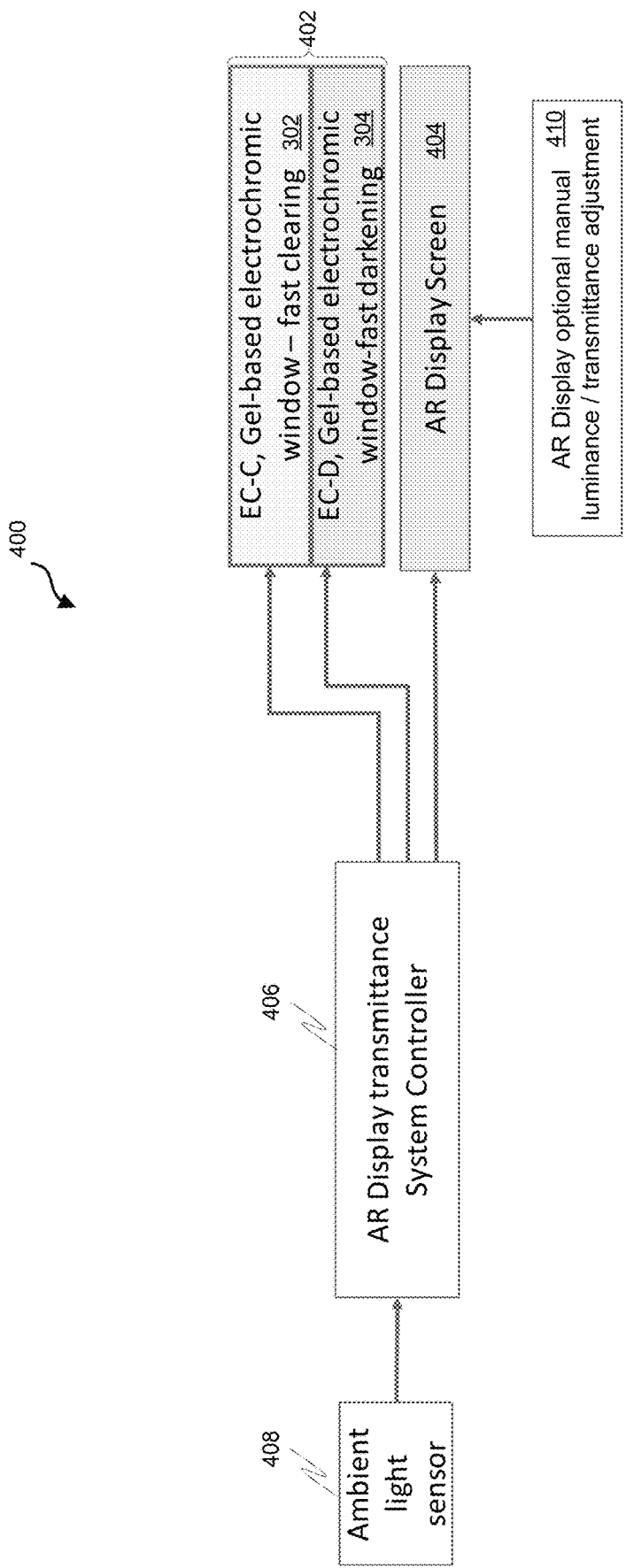
FIG. 4 is a block diagram depicting an example augmented display system that utilizes a tandem EC filter disposed over an augmented display screen, in accordance with some embodiments.

FIG. 4 is a block diagram depicting an example augmented display system 400 that utilizes a tandem EC filter 402 disposed over an augmented display screen 404 (e.g., an augmented reality display screen, an aircraft or land vehicle HUD, and others). The example augmented display system 400 includes the tandem EC filter 402 disposed over an augmented display screen 404 and an augmented display transmittance system controller 406 coupled to an ambient light sensor 408. The tandem EC filter 402 comprises a first gel-based EC window (EC-C) 302 optimized for faster clearing and a second gel-based EC window (EC-D) 304 optimized for faster darkening, wherein the composition of the EC gel and the EC cell design parameters in the EC-C window are optimized to achieve faster clearing and the EC gel and the EC cell design parameters in the EC-D window are optimized to achieve faster darkening times. The example augmented display system 400 may also include an optional manual luminance and/or transmittance adjustment 410 for manually adjusting the brightness level applied to the augmented display screen 404, and/or transmittance level applied to the EC filter 402. Output from the ambient light sensor 408 is used by the augmented display transmittance system controller 406 to determine the transmittance required from the switchable tandem EC filter 402 for a selected display luminance for the augmented display screen 404 for achieving a desired image contrast.

The augmented display transmittance system controller 406 includes at least one processor and a computer-readable storage device or media encoded with programming instructions for configuring the controller 406. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller 406.

The augmented display transmittance system controller 406 is configured to individually control the first filter (EC-C) 302 and the second filter (EC-D) 304 of the EC tandem filter 402. In particular, the augmented display transmittance system controller 406 is configured to: determine from an ambient light sensor output the transmittance required from the EC-C window 302 and the EC-D window 304 for a selected augmented display luminance and the direction of transition (e.g., darkening or clearing), for the selected augmented display luminance, and apply an appropriate darkening algorithm or lightening algorithm to control the activation of the first filter (EC-C) 302 and the second filter (EC-D) 304 of the EC tandem filter 402.

To perform a darkening transition, the augmented display transmittance system controller 406 is configured to: apply darkening drive voltage algorithms to the EC-D window 304 and the EC-C window 302 simultaneously; and when the transmittance value of the tandem EC filter 402 approaches close to the determined transmittance, continue applying a darkening voltage drive algorithm to the EC-C window 302 while applying a clearing drive voltage algorithm to the EC-D 304 window until the EC-C window 302 and the tandem EC filter 402 reach the determined transmittance with the EC-D window 304 at maximum transmittance wherein the EC-D window 304 is clear and the EC-C window 302 is controlling the transmittance. This will allow for faster clearing using the EC-C window if clearing is subsequently desired.

To perform a clearing transition, the augmented display transmittance system controller 406 is configured to: apply clearing drive voltage algorithms to the EC-D window 304 and the EC-C window 302 simultaneously; and when the transmittance value of the tandem EC filter 402 approaches close to the determined transmittance, continue applying a clearing voltage drive algorithm to the EC-D window 304 while applying a darkening drive voltage algorithm to the EC-C window 302 until the tandem EC filter 402 reaches the determined transmittance.

Figure 5:
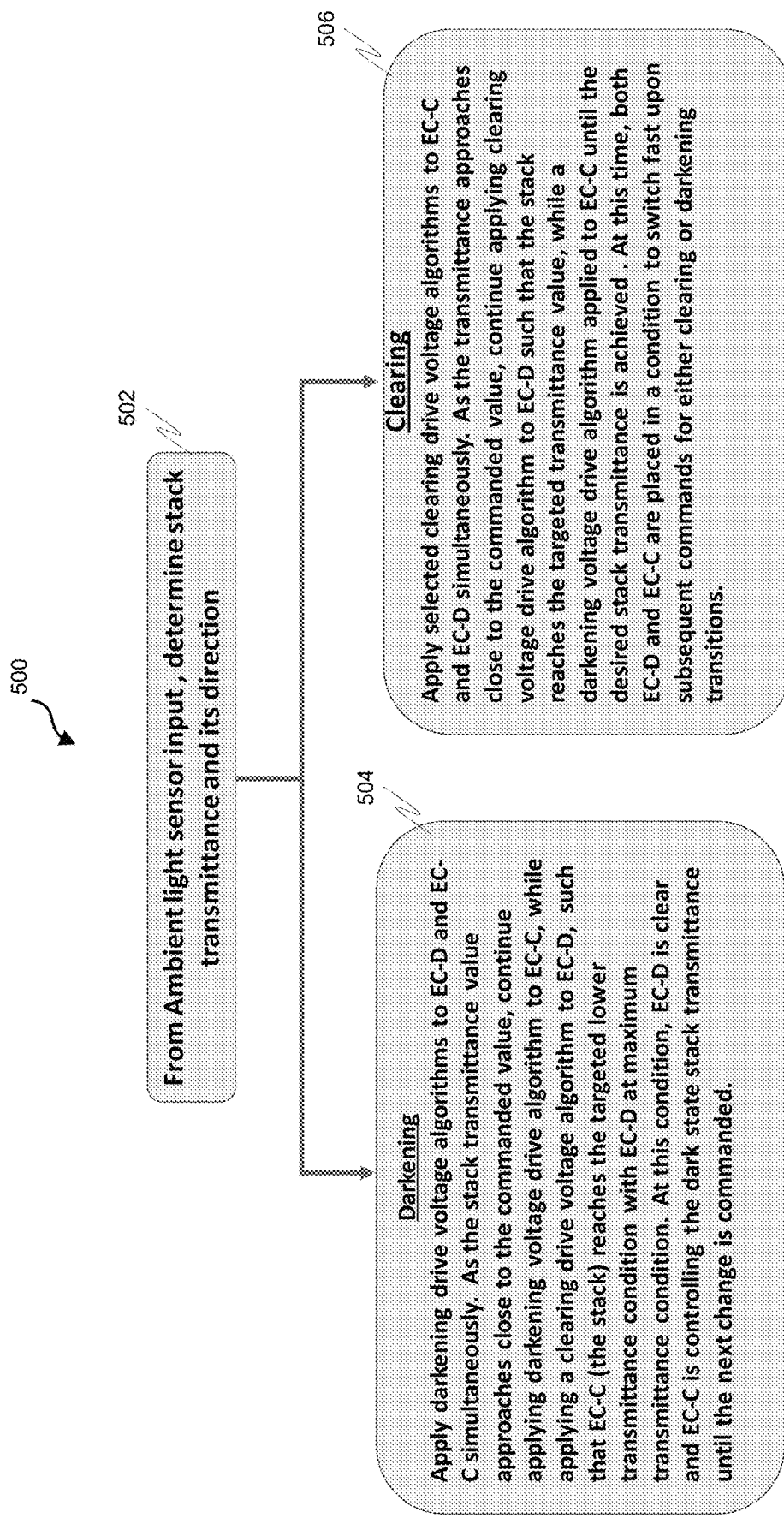
FIG. 5 is a process flow chart depicting an example process in an example augmented display system for achieving wide dynamic range transmittance control as well as fast switching, in accordance with some embodiments.

FIG. 5 is a process flow chart depicting an example process 500 in an example augmented display system for achieving wide dynamic range transmittance control as well as fast switching. In the example process 500, the ambient light sensor input is used to determine the transmittance change required as well as the direction of transition (darkening or clearing), for a selected augmented display luminance (operation 502).

When a darkening transition is required, the example process 500 includes applying darkening drive voltage algorithms to the EC-D filter and EC-C filter simultaneously (operations 504). As the stack transmittance value approaches close to the commanded value, the example processes 500 continuing to apply a darkening voltage drive algorithm to the EC-C filter, while applying a clearing drive voltage algorithm to the EC-D filter, such that the EC-C filter (and the stack) reaches the targeted lower transmittance condition with the EC-D filter at a maximum transmittance condition. At this condition, the EC-D filter is clear, and the EC-C filter controls the dark state stack transmittance until the next change is commanded. As the tandem EC device transitions to the commanded lower transmittance level, at a fast speed, aided by a fast darkening time of the EC-D filter, both the EC-C filter and the EC-D filter are placed respectively under lower and higher transmittance conditions. In this condition the tandem EC device can respond to further clearing or darkening transition commands, at a fast speed.

When a clearing transition is required, the example process 500 includes applying selected clearing drive voltage algorithms to the EC-C filter and the EC-D filter simultaneously. As the transmittance approaches close to the commanded value, the example processes 500 includes continuing to apply a clearing voltage drive algorithm to the EC-D filter such that it reaches a targeted transmittance value, while a darkening voltage drive algorithm is applied to the EC-C filter until the desired stack transmittance is achieved. At the time the tandem EC device is switched to its commanded transmittance condition, both the EC-D filter and the EC-C filter are placed in a condition to switch fast upon subsequent commands for either clearing or darkening transitions.

Detailed drive algorithms can be optimized for the EC-C filter and the EC-D filter in the stack to transition the stack transmittance from any transmittance to any other desired transmittance level (from fully dark to fully clear and vice versa) with a fast switching speed. As an additional level of augmented system optimization particularly for use in on-the-move operations (during mounted or dismounted operations) and rapidly changing ambient light conditions (such as in entering a cave or exiting a cave), multiple light sensors may be used to detect external (ambient) light conditions near and far with light sensors aimed at the near range and at a distant (upcoming) range, to prepare the EC filter stack for enhanced response time.

Described herein are apparatus, systems, techniques and articles for providing electronically switchable visible spectrum optical windows capable of wide dynamic range control of the see-through (ambient) scene luminance that can enable sunlight readable augmented display systems with optimum image contrast of the augmented display against the scene luminance. In one embodiment, an augmented display system with dynamic see-through transmittance control is provided. The augmented display system comprises: an augmented display screen; a tandem electrochromic (EC) filter disposed over the augmented display screen. The tandem EC filter comprises a first window having a dominant first transmittance characteristic and a second window having a dominant second transmittance characteristic; and an augmented display transmittance controller configured to individually control the activation of the first window and the second window of the tandem EC filter, wherein the augmented display transmittance controller is configured to: determine from an ambient light sensor output the transmittance required from the first window and the second window for a selected augmented display luminance; and apply appropriate drive voltage waveforms to the first window and the second window to achieve the determined transmittance.

These aspects and other embodiments may include one or more of the following features. The dominant first transmittance characteristic may comprise a dynamic range of greater than 100:1. The dominant second transmittance characteristic may comprise a switching speed of around several milli-seconds or less. The tandem EC filter may comprise a first window that provides a dynamic range of greater than 100:1 with a switching speed of around several seconds or more disposed over a second window with a switching speed of around several milli-seconds or less and a dynamic transmittance range of around 10:1. The augmented display transmittance system controller may be configured to activate only the second window to achieve the determined transmittance, for example through the application of an appropriate drive voltage waveform, when the determined transmittance can be achieved using only the second window. The augmented display transmittance system controller may be configured to activate both the first window and the second window, for example through the application of appropriate drive voltage waveforms, when the determined transmittance cannot be achieved using only the second window. The first window may comprise a gel-based EC window. The second window may comprise a LC (Liquid Crystal) based electronic window. The dominant first transmittance characteristic may comprise faster clearing. The dominant second transmittance characteristic may comprise faster darkening. The augmented display transmittance system controller may be configured to determine from an ambient light sensor output the direction of transition (e.g., darkening or clearing) for the selected augmented display luminance. The first window may comprise a first gel-based EC window optimized for faster clearing (EC-C) wherein the composition of the EC gel and the EC cell design parameters in the first window are optimized to achieve faster clearing. The second window may comprise a second gel-based EC window optimized for faster darkening (EC-D) wherein the composition of the EC gel and the EC cell design parameters in the second window are optimized to achieve faster darkening times. The augmented display transmittance controller may be configured to perform a darkening transition by: applying darkening drive voltage algorithms to the EC-D window and the EC-C window simultaneously; and when the transmittance value of the tandem EC filter approaches close to the determined transmittance, continue applying a darkening voltage drive algorithm to the EC-C window while applying a clearing drive voltage algorithm to the EC-D window until the EC-C window and the tandem EC filter reach the determined transmittance with the EC-D window at maximum transmittance wherein the EC-D window is clear and the EC-C window is controlling the transmittance. The augmented display transmittance controller may be configured to perform a clearing transition by: applying clearing drive voltage algorithms to the EC-D window and the EC-C window simultaneously, and when the transmittance value of the tandem EC filter approaches close to the determined transmittance, continue applying a clearing voltage drive algorithm to the EC-D window while applying a darkening drive voltage algorithm to the EC-C window until the tandem EC filter reaches the determined transmittance.

In another embodiment, an augmented display system with dynamic see-through transmittance control is provided. The augmented display system comprises: an augmented display screen; a tandem electrochromic (EC) filter disposed over the augmented display screen, wherein the tandem EC filter comprises a first window that provides a dynamic range of greater than 100:1 with a switching speed of around several seconds or more disposed over a second window with a switching speed of around several milli-seconds or less and a dynamic transmittance range of around 10:1; and an augmented display transmittance system controller for individually controlling the activation of the first window and the second window of the EC tandem filter. The augmented display transmittance system controller is configured to: determine from an ambient light sensor output the transmittance required from the first window and the second window for a selected augmented display luminance, activate only the second window to achieve the determined transmittance, for example through the application of an appropriate drive voltage waveform, when the determined transmittance can be achieved using only the second window, and activate both the first window and the second window, for example through the application of appropriate drive voltage waveforms, when the determined transmittance cannot be achieved using only the second window.

These aspects and other embodiments may include one or more of the following features. The first window may comprise a gel-based EC window. The second window may comprise an LC (Liquid Crystal) based electronic window. The tandem EC filter may comprise a gel-based EC window laminated to an LC based electronic window.

In another embodiment, an augmented display system with dynamic see-through transmittance control is provided. The augmented display system comprises: an augmented display screen; a tandem electrochromic (EC) filter disposed over the augmented display screen, wherein the tandem EC filter comprises a first window optimized for faster clearing (EC-C) and a second window optimized for faster darkening (EC-D); and an augmented display transmittance controller configured to individually control the activation of the first window and the second window of the tandem EC filter. The augmented display transmittance controller is configured to: determine from an ambient light sensor output the transmittance required from the first window and the second window for a selected augmented display luminance and the direction of transition (e.g., darkening or clearing) for the selected augmented display luminance; and activate both the first window and the second window, for example through the application of appropriate drive voltage waveforms, to achieve the determined transmittance.

These aspects and other embodiments may include one or more of the following features. The first window may comprise a first gel-based EC window optimized for faster clearing (EC-C) wherein the composition of the EC gel and the EC cell design parameters in the first window are optimized to achieve faster clearing. The second window may comprise a second gel-based EC window optimized for faster darkening (EC-D) wherein the composition of the EC gel and the EC cell design parameters in the second window are optimized to achieve faster darkening times. The augmented display transmittance controller may be configured to perform a darkening transition by: applying darkening drive voltage algorithms to the EC-D window and the EC-C window simultaneously; and when the transmittance value of the tandem EC filter approaches close to the determined transmittance, continue applying a darkening voltage drive algorithm to the EC-C window while applying a clearing drive voltage algorithm to the EC-D window until the EC-C window and the tandem EC filter reach the determined transmittance with the EC-D window at maximum transmittance wherein the EC-D window is clear and the EC-C window is controlling the transmittance. The augmented display transmittance controller may be configured to perform a clearing transition by: applying clearing drive voltage algorithms to the EC-D window and the EC-C window simultaneously, and when the transmittance value of the tandem EC filter approaches close to the determined transmittance, continue applying a clearing voltage drive algorithm to the EC-D window while applying a darkening drive voltage algorithm to the EC-C window until the tandem EC filter reaches the determined transmittance.

In another embodiment, an augmented display system with dynamic see-through transmittance control is provided. The augmented display system comprises: an augmented display screen; a tandem electrochromic (EC) filter disposed over the augmented display screen wherein the tandem EC filter comprises a gel-based EC window that provides a higher dynamic range (>100:1) but a slower switching speed (~several seconds) laminated to a LC (Liquid Crystal) based electronic window with a faster switching speed (~several milli-seconds) and a lower dynamic transmittance range (~10:1); and an augmented display transmittance controller configured to individually control the activation of the EC window and the LC-based window of the EC tandem filter, wherein the augmented display transmittance controller is configured to: determine from an ambient light sensor output the transmittance required from the EC window and the LC-based window for a selected augmented display luminance, activate only the LC-based window to achieve the determined transmittance when the determined transmittance can be achieved using only the LC-based window, activate both the LC-based window and the EC window when the determined transmittance cannot be achieved using only the LC-based window, and activate both the LC-based window and the EC window, for example through the application of appropriate drive voltage waveforms.

In another embodiment, an augmented display system with dynamic see-through transmittance control is provided. The augmented display system comprises: an augmented display screen; a tandem electrochromic (EC) filter disposed over the augmented display screen, wherein the tandem EC filter comprises a first gel-based EC window optimized for faster clearing (EC-C) and a second gel-based EC window optimized for faster darkening (EC-D), wherein the composition of the EC gel and the EC cell design parameters in the EC-C window are optimized to achieve faster clearing and the EC gel and the EC cell design parameters in the EC-D window are optimized to achieve faster darkening times; and an augmented display transmittance controller configured to individually control the activation of the EC-C window and the EC-D window of the tandem EC filter, wherein the augmented display transmittance controller is configured to: determine from an ambient light sensor output the transmittance required from the EC-C window and the EC-D window for a selected augmented display luminance and the direction of transition (e.g., darkening or clearing) for the selected augmented display luminance, perform a darkening transition by: applying darkening drive voltage algorithms to the EC-D window and the EC-C window simultaneously, when the transmittance value of the tandem EC filter approaches close to the determined transmittance, continue applying a darkening voltage drive algorithm to the EC-C window while applying a clearing drive voltage algorithm to the EC-D window until the EC-C window and the tandem EC filter reach the determined transmittance with the EC-D window at maximum transmittance wherein the EC-D window is clear and the EC-C window is controlling the transmittance; and perform a clearing transition by: applying clearing drive voltage algorithms to the EC-D window and the EC-C window simultaneously, and when the transmittance value of the tandem EC filter approaches close to the determined transmittance, continue applying a clearing voltage drive algorithm to the EC-D window while applying a darkening drive voltage algorithm to the EC-C window until the tandem EC filter reaches the determined transmittance.

In another embodiment, a tandem electrochromic (EC) filter for use in an augmented display system with dynamic see-through transmittance control is provided. The tandem EC filter comprises a first window that provides a dynamic range of greater than 100:1 with a switching speed of around several seconds or more disposed over a second window with a switching speed of around several milli-seconds or less and a dynamic transmittance range of around 10:1. The augmented display system comprises an augmented display screen; the tandem EC filter disposed over the augmented display screen; and an augmented display transmittance system controller for individually controlling the activation of the first window and the second window of the EC tandem filter. The augmented display transmittance system controller is configured to: determine from an ambient light sensor output the transmittance required from the first window and the second window for a selected augmented display luminance, activate only the second window to achieve the determined transmittance, for example through the application of an appropriate drive voltage waveform, when the determined transmittance can be achieved using only the second window, and activate both the first window and the second window, for example through the application of appropriate drive voltage waveforms, when the determined transmittance cannot be achieved using only the second window.

These aspects and other embodiments may include one or more of the following features. The first window may comprise a gel-based EC window. The second window may comprise a LC (Liquid Crystal) based electronic window. The tandem EC filter may comprise a gel-based EC window laminated to a LC based electronic window.

In another embodiment, a tandem electrochromic (EC) filter for use in an augmented display system with dynamic see-through transmittance control is provided. The tandem EC filter comprises a first window optimized for faster clearing (EC-C) and a second window optimized for faster darkening (EC-D). The augmented display system comprises: an augmented display screen; the tandem electrochromic EC filter disposed over the augmented display screen; and an augmented display transmittance controller configured to individually control the activation of the first window and the second window of the tandem EC filter. The augmented display transmittance controller is configured to: determine from an ambient light sensor output the transmittance required from the first window and the second window for a selected augmented display luminance and the direction of transition (e.g., darkening or clearing) for the selected augmented display luminance; and activate both the first window and the second window, for example through the application of appropriate drive voltage waveforms, to achieve the determined transmittance.

These aspects and other embodiments may include one or more of the following features. The first window may comprise a first gel-based EC window optimized for faster clearing (EC-C) wherein the composition of the EC gel and the EC cell design parameters in the first window are optimized to achieve faster clearing. The second window may comprise a second gel-based EC window optimized for faster darkening (EC-D) wherein the composition of the EC gel and the EC cell design parameters in the second window are optimized to achieve faster darkening times. The augmented display transmittance controller may be configured to perform a darkening transition by: applying darkening drive voltage algorithms to the EC-D window and the EC-C window simultaneously; and when the transmittance value of the tandem EC filter approaches close to the determined transmittance, continue applying a darkening voltage drive algorithm to the EC-C window while applying a clearing drive voltage algorithm to the EC-D window until the EC-C window and the tandem EC filter reach the determined transmittance with the EC-D window is at maximum transmittance wherein the EC-D window is clear and the EC-C window is controlling the transmittance. The augmented display transmittance controller may be configured to perform a clearing transition by: applying clearing drive voltage algorithms to the EC-D window and the EC-C window simultaneously, and when the transmittance value of the tandem EC filter approaches close to the determined transmittance, continue applying a clearing voltage drive algorithm to the EC-D window while applying a darkening drive voltage algorithm to the EC-C window until the tandem EC filter reaches the determined transmittance.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An augmented display system with dynamic see-through transmittance control, the augmented display system comprising:
    an augmented display screen;
    a tandem electrochromic (EC) filter disposed over the augmented display screen, the tandem EC filter comprising a first window having a dominant first transmittance characteristic and a second window having a dominant second transmittance characteristic, wherein the dominant first transmittance characteristic is different from the dominant second transmittance characteristic, and wherein the second window has a faster darkening speed than the first window; and
    an augmented display transmittance controller configured to individually control the activation of the first window and the second window of the tandem EC filter, wherein the augmented display transmittance controller is configured to:
    determine from an ambient light sensor output the transmittance required from the first window and the second window for a selected augmented display luminance; and
    apply appropriate drive voltage waveforms to the first window and the second window to achieve the determined transmittance.

2. The augmented display system of claim 1, wherein the dominant first transmittance characteristic comprises a dynamic range and the first window has a higher dynamic range than the second window.

3. The augmented display system of claim 1, wherein the dominant second transmittance characteristic comprises a switching speed and the second window has a faster darkening speed than the first window.

4. The augmented display system of claim 1, wherein the tandem EC filter comprises a first window that has a higher dynamic range than the second window and is disposed over a second window that has a faster darkening speed than the first window.

5. The augmented display system of claim 1, wherein the augmented display transmittance system controller is configured to activate the second window to achieve the determined transmittance when the determined transmittance can be achieved using only the second window.

6. The augmented display system of claim 5, wherein the augmented display transmittance system controller is configured to activate both the first window and the second window when the determined transmittance cannot be achieved using only the second window.

7. The augmented display system of claim 6, wherein the first window comprises a gel-based EC window.

8. The augmented display system of claim 7, wherein the second window comprises a LC (Liquid Crystal) based electronic window.

9. The augmented display system of claim 1, wherein the dominant first transmittance characteristic comprises faster clearing and the dominant second transmittance characteristic comprises faster darkening.

10. The augmented display system of claim 1, wherein the augmented display transmittance system controller is configured to determine from an ambient light sensor output the direction of transition, for the selected augmented display luminance.

11. The augmented display system of claim 1, wherein the first window comprises a first gel-based EC window optimized for faster clearing (EC-C) wherein the composition of EC gel and EC cell design parameters in the first window are optimized to achieve faster clearing.

12. The augmented display system of claim 11, wherein the second window comprises a second gel-based EC window optimized for faster darkening (EC-D) wherein the composition of EC gel and EC cell design parameters in the second window are optimized to achieve faster darkening times.

13. The augmented display system of claim 12, wherein the augmented display transmittance controller is configured to perform a darkening transition by:
    applying darkening drive voltage algorithms to the EC-D window and the EC-C window simultaneously; and
    when the transmittance value of the tandem EC filter approaches close to the determined transmittance, continue applying a darkening voltage drive algorithm to the EC-C window while applying a clearing drive voltage algorithm to the EC-D window until the EC-C window and the tandem EC filter reach the determined transmittance with the EC-D window at maximum transmittance wherein the EC-D window is clear and the EC-C window is controlling the transmittance.

14. The augmented display system of claim 13, wherein the augmented display transmittance controller is configured to perform a clearing transition by:
    applying clearing drive voltage algorithms to the EC-D window and the EC-C window simultaneously, and
    when the transmittance value of the tandem EC filter approaches close to the determined transmittance, continue applying a clearing voltage drive algorithm to the EC-D window while applying a darkening drive voltage algorithm to the EC-C window until the tandem EC filter reaches the determined transmittance.

15. An augmented display system with dynamic see-through transmittance control, the augmented display system comprising:
    an augmented display screen;
    a tandem electrochromic (EC) filter disposed over the augmented display screen, the tandem EC filter comprising a first window and a second window, wherein the first window has a higher dynamic range than the second window, wherein the second window has a faster darkening speed than the first window; and
    an augmented display transmittance system controller for individually controlling the activation of the first window and the second window of the EC tandem filter, the augmented display transmittance system controller configured to:
    determine from an ambient light sensor output the transmittance required from the first window and the second window for a selected augmented display luminance,
    activate the second window to achieve the determined transmittance when the determined transmittance can be achieved using only the second window, and
    activate both the first window and the second window when the determined transmittance cannot be achieved using only the second window.

16. The augmented display system of claim 15, wherein the first window comprises a gel-based EC window and the second window comprises a LC (Liquid Crystal) based electronic window.

17. An augmented display system with dynamic see-through transmittance control, the augmented display system comprising:
- an augmented display screen;
- a tandem electrochromic (EC) filter disposed over the augmented display screen, the tandem EC filter comprising a first window optimized for faster clearing (EC-C) and a second window optimized for faster darkening (EC-D), wherein the first window has a faster clearing speed than the second window, and wherein the second window has a faster darkening speed than the first window; and
- an augmented display transmittance controller configured to individually control the activation of the first window and the second window of the tandem EC filter, wherein the augmented display transmittance controller is configured to:
- determine from an ambient light sensor output the transmittance required from the first window and the second window for a selected augmented display luminance and the direction of transition, for the selected augmented display luminance; and
- activate both the first window and the second window to achieve the determined transmittance.

18. The augmented display system of claim 17, wherein:
the first window comprises a first gel-based EC window optimized for faster clearing (EC-C) wherein the composition of EC gel and EC cell design parameters in the first window are optimized to achieve faster clearing; and
the second window comprises a second gel-based EC window optimized for faster darkening (EC-D) wherein the composition of EC gel and EC cell design parameters in the second window are optimized to achieve faster darkening times.

19. The augmented display system of claim 17, wherein the augmented display transmittance controller is configured to perform a darkening transition by:
- applying darkening drive voltage algorithms to the EC-D window and the EC-C window simultaneously; and
- when the transmittance value of the tandem EC filter approaches close to the determined transmittance, continue applying a darkening voltage drive algorithm to the EC-C window while applying a clearing drive voltage algorithm to the EC-D window until the EC-C window and the tandem EC filter reach the determined transmittance with the EC-D window at maximum transmittance wherein the EC-D window is clear and the EC-C window is controlling the transmittance.

20. The augmented display system of claim 17, wherein the augmented display transmittance controller is configured to perform a clearing transition by: applying clearing drive voltage algorithms to the EC-D window and the EC-C window simultaneously, and
when the transmittance value of the tandem EC filter approaches close to the determined transmittance, continue applying a clearing voltage drive algorithm to the EC-D window while applying a darkening drive voltage algorithm to the EC-C window until the tandem EC filter reaches the determined transmittance.

* * * * *